Patented Apr. 8, 1930

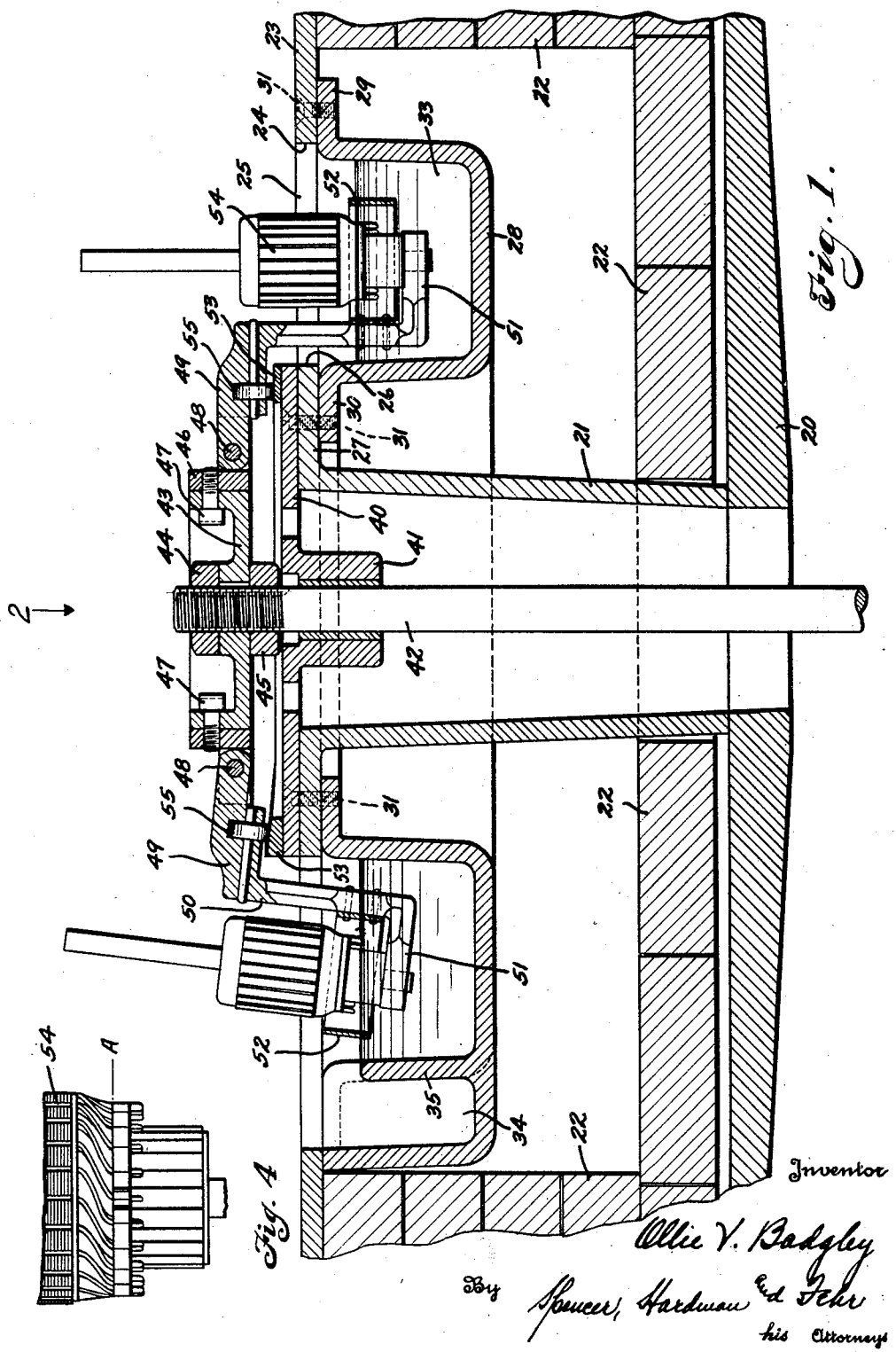

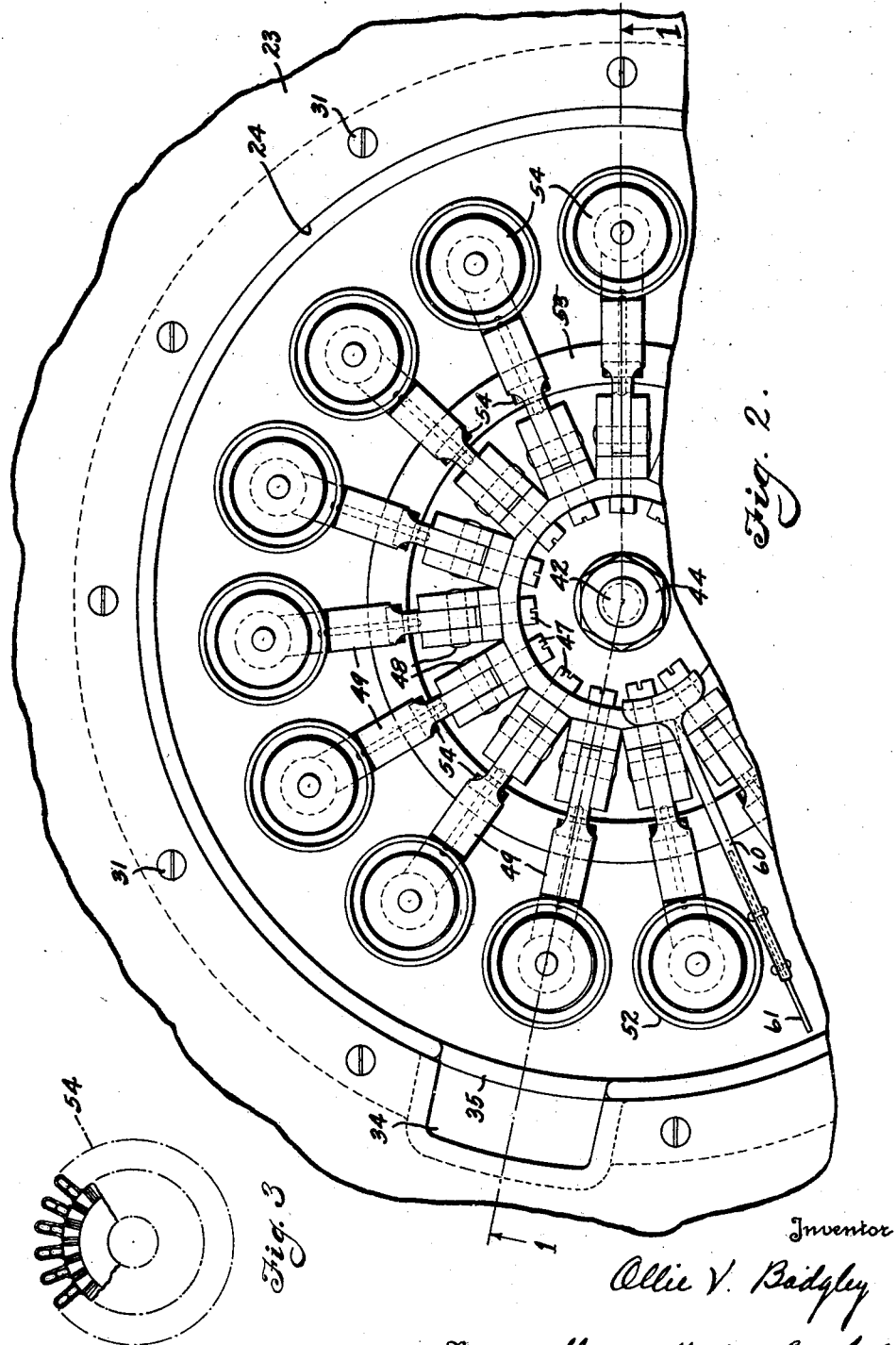

1,753,639

UNITED STATES PATENT OFFICE

OLLIE V. BADGLEY, OF ANDERSON, INDIANA, ASSIGNOR TO DELCO-REMY CORPORATION, OF DAYTON, OHIO, A CORPORATION OF DELAWARE

SOLDERING MACHINE

Application filed March 3, 1927. Serial No. 172,479.

The present invention relates to a soldering apparatus and particularly to such apparatus adapted to solder a series of work pieces.

It is among the objects of the present invention to provide a soldering device capable of receiving a plurality of work pieces and properly applying a soldering medium to them.

Further objects and advantages of the present invention will be apparent from the following description, reference being had to the accompanying drawings, wherein a preferred form of embodiment of the present invention is clearly shown.

In the drawings:

Fig. 1 is a transverse sectional view taken along the line 1—1 of Fig. 2;

Fig. 2 is a fragmentary plan view of the soldering apparatus;

Fig. 3 is a fragmentary end view of the work piece to be soldered; and

Fig. 4 is a fragmentary side view of the work piece.

Referring to the drawings, the numeral 20 designates a base supporting a hollow central supporting member 21. 22 designates the walls of a heating oven adapted to contain any suitable device (not shown). A cover plate 23 is provided on the oven, said cover plate having an annular opening 24 defining one side of the ring-shaped opening 25, the other side of said opening being defined by the annular edge 26 of the flange 27 formed on the hollow supporting member 21.

An annular tank 28 has outwardly extending flanges 29 and 30 at its inner and outer edges, said flanges being apertured to receive screws 31 for suspending said tank from the flange 27 and the cover 23 so that the annular opening 25 is positioned directly above the tank 28. Molten solder, designated by the numeral 33, is adapted to be maintained at a proper level in the tank 28.

At one side of the tank there is provided an off-set chamber 34 adapted to receive slag which tends to form on the surface of the molten solder. The top of the wall 35 dividing the main tank portion 28 and the chamber 34 is substantially level with the surface of the solder so that the scraping paddle (to be described hereinafter) will tend to push the slag from the tank 28 into the chamber 34 over the top of wall 35.

Resting on the top of the hollow supporting member 21 is a disc 40, which is provided with a bearing portion 41 arranged coaxially with the tank 28. In this bearing there is journalled the main drive shaft 42, the lower end of which is connected to any suitable drive mechanism (not shown). The upper end of this drive shaft extends above the disc 40 and has a driving ring 43 slidably keyed thereon. Nuts 44 and 45 arranged screwthreadedly attached to the shaft 42 and respectively arranged on opposite sides of the driving ring 43, hold the said driving ring in longitudinal adjusted position on the shaft 42. A ring 46 surrounds the driving disc 43 and is attached thereto by means of screws 47. This ring has a plurality of pairs of yoke arms radially extended therefrom, each pair of said yoke arms having aligned apertures therein for receiving a pin 48, upon which is hingedly secured one end of a work piece supporting arm 49. Each work piece supporting arm has a portion 50 extending downwardly into the molten solder in the tank. At the end of this portion 50, each arm is provided with a work piece supporting platform 51, substantially parallel with the surface of the solder in the tank. The platform is apertured to receive a portion of the work piece in the present drawing illustrated as being an armature. A sleeve-like member 52 is secured to the arm 50 adjacent the platform portion 51 so as to be coaxial with the aperture in said platform portion. This sleevelike member acts as a dash pot when passing through the solder, as will be explained hereinafter.

On each arm 49 there is provided a rotatable roller 55 which is adapted to ride on a circular drag 53 supported on the disc 40 and lying adjacent the outer edge thereof. A portion of this drag gradually inclines to and declines from a predetermined point on the apparatus. In the Fig. 1 the arm 49 is shown having its roller 55 riding on the level portion of the tank, thus showing the work piece or armature 54 dipped into the solder to a proper level. The diametrically opposite arm 49 is shown having its roller riding upon the higher portion of the tank so that the work piece is being lifted from the solder when the roller rides on the inclined portion, while said work piece will be lowered into the solder when the roller is riding on the decline portion of the drag. The line A designates the proper level to which an armature should be dipped into the molten solder. At this level the armature leads contained in their respective commutator clips will be securely soldered to said clips. If the level of the solder is raised, it will engage with the insulation on the armature leads and tend to burn it off and cause a short circuit, while if the level is lowered, poor connections between the armature leads and their respective commutator clips are obtained.

In order to keep the surface of the solder substantially clear of slag, which has a tendency to form on the surface thereof, applicant has provided an arm 60 secured to the driving disc 43 so that said arm extends between two adjacent supporting arms 49. To this arm 60 there is attached a paddle 61 which dips into the molten solder and is carried around through the tank by the action of the turn table. The paddle 61 pushes the slag on the solder ahead of it, and as the slag approaches the wall 35 defining the one side of chamber 34, it will have a tendency to slide over said wall and drop into the chamber 34, from which it may readily be removed. The angularity of the paddle 61 tends to force the slag against the outer wall of the tank, thereby facilitating the discharge of said slag over the wall 35 into said chamber.

The operation of the device is as follows:

The drive mechanism (not shown) rotates the shaft 42 and consequently the turn table comprising the driving disc 43 and its surrounding ring 46, carrying the supporting arms 49. Rotation of the turn table will move the arms 49 through the tank, the portions 51 of said arms dipping into the solder to a proper level. If said arms dip into the solder too far, the nut 45 is operated downwardly on the shaft toward the bearing portion 41 and the nut 44 is then drawn down tight against the driving disc, thereby raising the platform portion 51 of the arm and consequently reducing the depth of their dip into the molten solder. Reverse adjustment it will be understood will cause them to dip deeper into said solder. When the supporting arm 49 is moved so that its roller will move on the incline surface of the drag 53, the platform portion 51 of the arm will be raised above the surface of the solder, at which time a work piece is placed upon said platform. Passing over the crest of the incline and starting down the decline surface of the drag, the arm will gradually enter the solder, thus gradually introducing the work piece into said solder in a path of movement inclined to the surface of the solder. This movement substantially eliminates the possibility of splash or agitation of the solder. In order to further safeguard against such splashing or agitation, a sleeve-like dash pot 52 is provided surrounding the work piece so that while the work piece is being moved through the solder, any splash due to such movement will be dissipated against the outside of this dash pot member, the solder within being kept substantially at the proper level and in no way being agitated by such movement. The speed of the apparatus and the length of the lower portion of the drag are such that the work piece is maintained in the molten solder for a proper time interval to assure a good solder joint and substantially to insure against the attack of the solder upon other portions of the work piece which are not to be soldered, but which must be dipped into the solder to effect solder connection between the armature leads and the respective commutator clips.

The drag 53 must be removed and another be substituted when other work pieces which require different operation of the machine are being treated.

One advantage of the present apparatus is that a continuous stream of work pieces must be treated,—that is, as the treated work piece is removed, an untreated one may be substituted. Another advantage is that with the gradual introduction and withdrawal of the work piece into and from the solder in a path of movement inclined to the surface of said solder, splashing is substantially eliminated and thereby possibility of injury to the work piece is greatly reduced.

While the form of embodiment of the present invention as herein disclosed, constitutes a preferred form, it is to be understood that other forms might be adopted, all coming within the scope of the claims which follow.

What is claimed is as follows:

1. A device of the character described comprising, in combination, a heating oven, a tank in said oven, for containing molten solder at a certain level, a conveyor adapted to pass over said tank, supporting members attached to the conveyor, each including a depending arm provided with a platform portion substantially parallel with the surface of the solder and apertured to receive the shaft of an armature to hold said armature substantially upright with its commutator adjacent the solder, and means for dipping said members into the solder while maintaining the armature substantially upright.

2. A device of the character described comprising, in combination, a heating oven, a tank in said oven, for containing molten solder at a certain level, a conveyor adapted to pass over said tank, supporting members attached to the conveyor, each including a depending arm provided with a platform portion substantially parallel with the surface of the solder and apertured to receive the shaft of an armature to hold said armature substantially upright with its commutator adjacent the solder, and means for dipping said members into the solder while maintaining the armature substantially upright, and a sleeve member secured to each depending arm of the supporting members so as to be substantially coaxial with the aperture in the platform of each member, each ring providing means for preventing agitation of the surface of the solder immediately around the commutator of the armature supported by said member.

3. A device of the character described comprising, in combination, an annular heating oven having cover plates presenting an annular opening, a tank containing a liquid in said oven located directly beneath the annular opening, a conveyor adapted to be rotated over the annular opening, a work piece supporting platform carried by the conveyor and means for dipping said work piece into the liquid in said tank through said annular opening.

4. A machine for soldering armature leads to commutator segments comprising, in combination, a heating oven, a tank in said oven for containing molten solder, a conveyor adapted to pass over said tank, and means secured to said conveyor so constructed and arranged as to support the armature substantially upright with the commutator segments downward, means for dipping said commutator segments into the solder, and means for preventing agitation of the surface of the solder immediately around the commutator of the armature.

5. A device of the character described comprising, in combination, a tank containing a liquid at a certain level, a conveyor adapted to pass over said tank, a plurality of supporting means attached to the conveyor, each of said supporting means including a depending arm provided with a platform portion substantially parallel with the surface of the liquid for supporting an armature, and means for dipping said armature into said liquid.

6. A device of the character described comprising, in combination, a tank containing molten solder, heating means for said tank, a rotary conveyor adapted to pass over said tank, supporting members attached to said conveyor, said supporting member being apertured to receive the shaft of an armature so as to hold it in a substantially upright position with its commutator segments adjacent the solder and means for dipping said armature into said solder.

7. A device of the character described comprising, in combination, an annular tank containing molten solder, means for heating said tank, a conveyor adapted to pass over said tank, supporting members attached to said conveyor, each including a depending arm, provided with a horizontal platform portion apertured to receive the shaft of an armature to hold said armature substantially upright with the commutator segments downwardly adjacent the solder, means for dipping said members into said solder, means connected to said conveyor for removing slag from said solder, and means comprising a tank radially disposed with respect to said annular tank for receiving the slag removed from said solder.

8. A machine for soldering armature leads to commutator segments comprising, in combination, a heating oven, cover plates for said oven presenting an annular opening, a tank suspended in said oven from said cover plates, and armature carriers rotatably supported on one of the cover plates, each of said carriers including a depending arm for supporting the weight of said armatures and adapted to be dipped through the annular opening presented by said cover plates and into the tank as said carriers are rotated.

In testimony whereof I hereto affix my signature.

OLLIE V. BADGLEY.